March 20, 1951     R. E. LAMBERT     2,545,619
ELECTRIC GLASS FURNACE

Filed Aug. 5, 1947     2 Sheets-Sheet 1

INVENTOR.
ROGER EMILE LAMBERT
BY
Dale A. Bauer
ATTORNEY

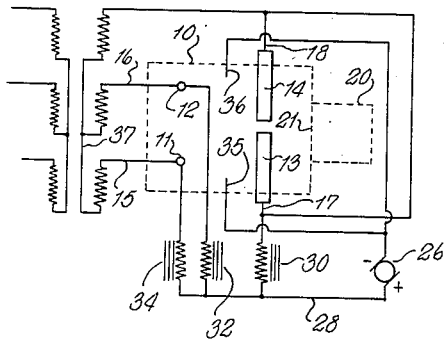
Fig. 2.
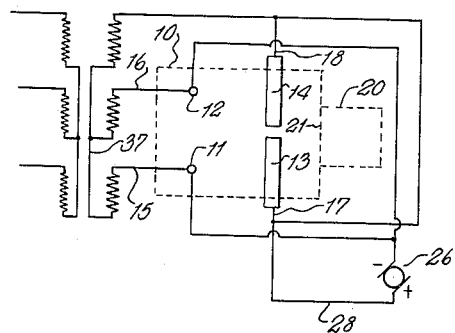
Fig. 5.
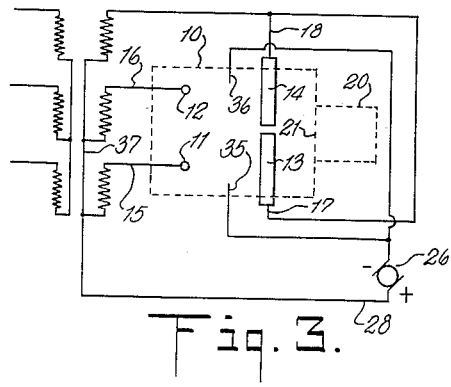
Fig. 3.
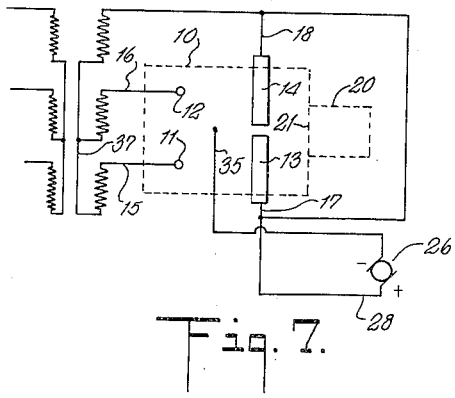
Fig. 6.
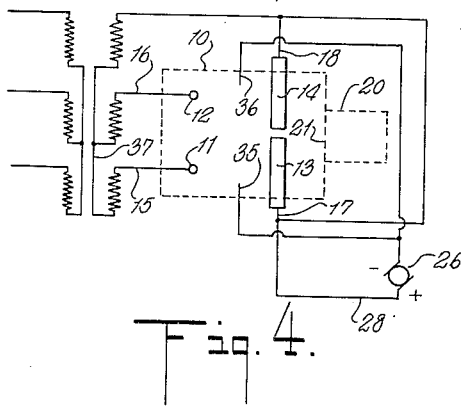
Fig. 4.
Fig. 7.
INVENTOR.
Roger Emile Lambert
BY
Dale A. Bauer
ATTORNEY

UNITED STATES PATENT OFFICE 2,545,619

ELECTRIC GLASS FURNACE

Roger Emile Lambert, Paris, France, assignor to Societe Anonyme des Manufactures des Glaces et Produits Chimiques de Saint-Gobain, Chauny & Cirey, Paris, France Application August 5, 1947, Serial No. 766,262
In France August 11, 1943

Section 1, Public Law 690, August 8, 1946
Patent expires August 11, 1963

3 Claims. (Cl. 13—6)

This invention relates to a process and apparatus for making glass and has particular relation to the making of glass in electric furnaces that employ carbon electrodes for heating, but it is equally applicable to any type of furnace in which carbon elements come in contact with molten glass.

In electric furnaces for making glass heating is accomplished either by passing an electric current through the glass between electrodes immersed in the glass, or by means of an electric resistor immersed in the glass. In either case the electrodes are often made of graphite.

It has been observed that in certain cases the graphite electrodes, or other types of graphite elements which are immersed in the glass, are attacked and tint the glass that comes in contact with the graphite. This phenomenon is observed particularly when glass of small coefficient of expansion, containing boric acid is fused, and it appears even when the elements made of graphite act simply as heat resistors, i. e. when the electric current does not pass from this element to the glass. It might be supposed that the attack of the glass on the electrodes is due to the chemical composition of the bath as well as to the very high temperature that is necessary for the fusion of this kind of glass, but whatever the reason the fact is recognized.

An object of the present invention is to completely or partially prevent the coloration of the glass by carbon bodies that come in contact with it.

Another and principal object of the invention is to prevent the coloration of glass due to the disintegration of pieces of graphite that are submerged in the bath. The invention extends to all cases where graphite elements are found in contact with glass at high temperature, whether these pieces of carbon are electrodes or not. They might, for instance, be present to modify, due to their high conductivity, the distribution of the electric current between the electrodes through the glass bath.

Another object of the invention is to construct an apparatus adapted to carry into effect the conceptions of the process but without employing complex constructions.

Another object of the invention is to supply alternating and direct current to a glass bath from a single electrode.

The invention will be described in its relation to the operation of a glass furnace that accomplishes the processing of the glass, or part of it, by Joule effect. In such furnaces electrodes are immersed in the glass bath and alternating current is passed between them. This has proved to be a very satisfactory method of making glass. It is to be understood, however, that this description is only for purposes of illustration and evidence, and that the said description shall not be construed as a limitation of the invention to that particular type of furnace.

The invention is accomplished by the electrolysis of certain elements of the glass bath by the introduction of direct current to the bath while the processing of the glass is proceeding and while the carbon electrodes or other pieces of carbon are in the bath, the carbon element or electrode, the coloring action of which on the glass is to be prevented, being used as an anode. In the case of a furnace operating by Joule effect the carbon electrodes that introduce the alternating current to the bath are preferably employed as anodes for the direct current. In order to prevent the alternating current from passing to the direct current generator, choke coils are interposed that block the alternating current, but permit the passage of the direct current.

As the direct current passes through the bath, oxygen is liberated at the anodes in accordance with the following reactions, when silico borates are present in the glass bath:

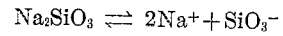

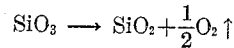

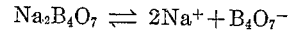

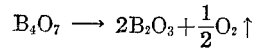

At the cathode the liberated sodium reacts on the bath to give silicon or boron. The production of silicon dioxide or of $B_2O_3$, that accompanies the liberation of oxygen at the anode, might be thought to have the effect of arresting the passage of current because of the phenomenon known under the name of anode effect and to put an end to the liberation of oxygen, but this anode effect is easy to avoid under the usual conditions employed in the present invention, because the elements of graphite that cause the coloration of the glass are carried at high temperature which facilitates the dissolution of silica or of boric anhydrid in the glass and negatives the anode effect. Furthermore, it is not necessary to use an electrolytic current of great intensity to prevent decoloration because the quantities of silicon formed are small and easily dissolved in the hot glass about the electrode.

By reason of this invention the coloration of the glass is totally suppressed or materially reduced. This may be because of the oxygen liberated at the anodes, which serves to burn either the carbon, which has been attacked by the bath, or products of attack such as boron, silicon, borides, and silicides. It is not necessary to pass through the bath an electrolytic current that gives a complete decoloration, but one may use a current sufficient to partially decolor the glass and later complete the decoloration by other physical or chemical means such as the action of oxidants such as zinc oxide, barium sulfate, sodium sulfate, or titanium dioxide, which are added to the composition that is introduced into the bath. These oxidants are decomposed not only by thermic action but also by electrolytic action.

The accompanying drawing diagrammatically illustrates a glass making furnace operating by Joule effect and embodying the principles of this invention.

Figure 2 is a circuit diagram for the circuit of Figure 1.

Figure 3 is a circuit diagram for the modification described in column 3, lines 70–75.

Figure 4 is a circuit diagram for the modification described in column 4, lines 11–21.

Figure 5 is a circuit diagram for the modification described in column 4, lines 22–25.

Figure 6 is a circuit diagram for the modification described in column 4, lines 25–27.

Figure 7 is a circuit diagram for the modification described in column 4, lines 27–32.

Figure 1:
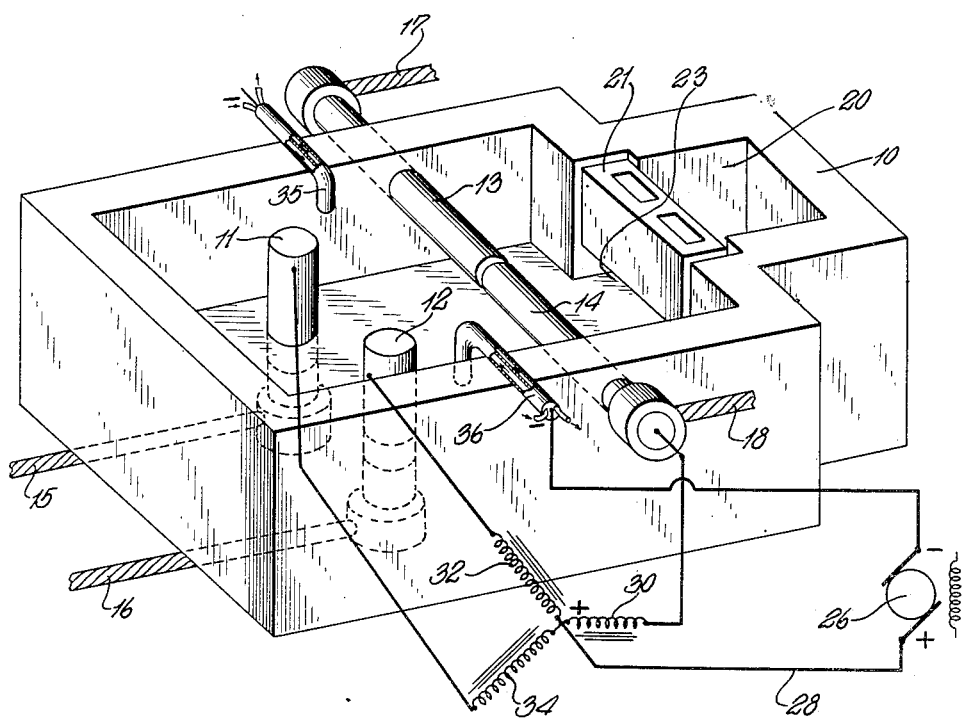
Figure 1 is a perspective view of a glass furnace equipped with the apparatus necessary to carry out the invention.

In the drawing the numeral 10 indicates the tank of the glass making furnace through the bottom of which, in the melting zone, project two electrodes 11 and 12, and through the walls of which project two horizontally placed electrodes 13, 14 in the fining zone. All four electrodes are submerged in the bath during normal conditions of operation. The electrode 11 is fed through conductor 15 with one phase of a three phase current, electrode 12 is fed through conductor 16 with a second phase of the three phase current, and electrodes 13, 14 carry the third phase through conductors 17, 18, respectively. The working zone of the furnace is indicated by the numeral 20 and is partially separated from the other zones by a baffle 21, having an orifice 23 for the admittance of fined glass.

The direct current that is supplied to the bath for electrolytic purposes is generated in a generator 26 and passes to the bath through a conductor 28 and choke coils 30, 32, 34, each of which is connected to one of the electrodes 11, 12, and 14. Consequently, these electrodes serve not only for the passage of the alternating current that produces the Joule effect but also for the admittance to the bath of the direct current furnished by generator 26. The cathodes are iron pipes 35, 36 each of which is connected to the return side of the generator. These pipes are hollow and are supplied internally with cooling water as diagrammatically indicated at 35, to prevent them from being disintegrated.

If the direct current is not too high, and if the three phases are not too unbalanced, it is possible to eliminate the auxiliary coils and use the neutral point of the transformer secondary by connecting it to the positive pole of the direct current generator.

From time to time the cathodes 35, 36 may be raised to remove the deposit of silicon or boron, if at any time these do not detach themselves and burn on the surface of the bath in contact with the batch materials before entering into the reactions taking place within the glass bath.

In the example considered, all the graphite elements are connected to the direct current generator and serve as anodes. In certain cases it is sufficient to serve only some graphite elements with direct current. For instance the direct current generator need not be connected to the elements situated in the parts of the furnace that are at a lower temperature or which contain glass that does not mix with the mass of glass gathered for utilization. It is likewise unnecessary to protect those of the electrodes that are placed near materials not yet vitrified because the fusion of these materials liberates enough oxidizing elements to neutralize the carbon dispersed in the glass.

Under such conditions it is possible to eliminate the use of auxiliary cathodes and to use as cathodes those graphite elements that are not used as anodes. One may, if desired, use as cathodes certain parts of the furnace that become conductive at high temperatures, but one will more frequently gain advantage, generally speaking, by placing the cathode at a point of the furnace which corresponds to the neutral point of the current passing in the bath between the electrodes. Thus, it is possible to reduce the alternating tension which tends to be established in the direct current machine.

The invention includes:

An improvement in the processes of manufacturing glass in electric furnaces containing submerged graphite elements such as electrodes or resistors which comprises passing into the bath of glass a continuous electric current that produces a partial electrolysis of the materials in fusion, while using as anodes for the electrolytic current graphite elements whose action in coloring the glass is to be opposed.

A form of execution relative to electrolytic furnaces in which the glass is heated by passage of the current through its mass, this form of execution being characterized in that the graphite element of which it is desired to combat the coloring action on the glass is connected to the positive pole of an electrolytic generator of which the negative pole is connected to one or more auxiliary cathodes, the connection of the generator to the graphite element passing through coils that block the alternating current used in heating.

The modification of the above form of execution in which the connection of the generator to graphite elements is made from the neutral point of the secondary of the transformer that accomplishes the heating.

The use of cathodes constituted by iron tubes through which is passed a circulation of water.

A method of execution in accordance with the invention in which only one part of the graphite elements is utilized as an anode, whereas all or part of the other graphite elements are utilized as cathodes.

As many apparently widely different embodiments of the present invention may be made without departing from the spirit and scope thereof, it is to be understood that the invention is not limited to the specific embodiments, except as defined in the appended claims.

What is claimed is:

1. Apparatus for making glass including a furnace, graphite electrodes for the introduction of alternating current to the glass bath, a source of alternating current electrically connected to said electrodes, and circuit means to supply constant direct current to said electrodes acting as anodes, said direct current circuit containing choking means against the passage of alternating current.

2. The apparatus of claim 1 in which the choking means include choke coils interposed in the direct current circuit to prevent the passage of alternating current.

3. The apparatus of claim 1 in which the choking means includes a transformer secondary for the alternating current circuit having a neutral point, the direct current circuit being electrically connected to said neutral point to supply direct current thereto and through it to the electrodes acting as anodes.

ROGER EMILE LAMBERT.

REFERENCES CITED

The following references are of record in the file of this patent:

UNITED STATES PATENTS

| Number | Name | Date |
|---|---|---|
| 732,616 | Burgess et al. | June 30, 1903 |
| 1,060,839 | Hauss | May 16, 1913 |
| 1,529,249 | Gue | Mar. 10, 1925 |
| 1,710,747 | Smith | Apr. 30, 1929 |
| 1,785,888 | Cox et al. | Dec. 23, 1930 |
| 1,955,451 | Blau | Apr. 17, 1934 |
| 2,000,278 | Ferguson | May 7, 1935 |
| 2,186,718 | Ferguson | Jan. 9, 1940 |
| 2,198,304 | Cornelius | Apr. 23, 1940 |
| 2,267,537 | Romazzotti | Dec. 23, 1941 |

FOREIGN PATENTS

| Number | Country | Date |
|---|---|---|
| 557,262 | Great Britain | Nov. 12, 1943 |
| 854,991 | France | Jan. 29, 1940 |